United States Patent Office 2,918,392
Patented Dec. 22, 1959

2,918,392

METHOD OF DEPOSITING METAL IN THE PORES OF A POROUS BODY

Hans Beller, Watchung, N.J., assignor to General Aniline & Film Corporation, New York, N.Y., a corporation of Delaware No Drawing. Application January 4, 1957
Serial No. 632,409

2 Claims. (Cl. 117—98)

The invention here presented is a new procedure for depositing metal within the pores of a porous solid body by the procedure of soaking or instilling into the solid body a significant quantity of liquid metal carbonyl under circumstances to permit of the holding of the liquid carbonyl in place while it is heated to the decomposition temperature to deposit the metal as such in the pores of the solid body.

The various carbonyls, principally nickel and iron, are well known and have been put to various uses, because of the ease of volatilization, and the low decomposition temperature which deposits the pure metal in the place to which the liquid has been passed; but since the boiling point of the carbonyls is usually lower than the temperature of decomposition, the metal is usually deposited from the gaseous form, not from the liquid, and accordingly to get a substantial deposit of metal by thermal decomposition, it must be possible to pass a considerable current of the metal carbonyl over the surface upon which the deposit is desired; but for many purposes this cannot be done.

It is now found that the boiling point and thermal decomposition point are near enough together so that the pressure which can be developed by surface tension, such as within small pores in a porous material such as porcelain, is sufficient to retain the metal carbonyl in liquid form long enough to permit of the decomposition of the metal within the pores from the liquid state.

Accordingly the process of the invention is found in the procedure of passing a liquid carbonyl such as nickel carbonyl or iron carbonyl into the pores of a porous body such as a ceramic material, and when the pores are sufficiently filled; heating the porous body to a suitable temperature, relying upon the capillary forces and surface tension to hold the metal carbonyl in the liquid form until the temperature of decomposition is reached whereupon the compound is broken down, the metal deposited, and the carbon monoxide discharged from the pores.

Thus the process of the invention deposits substantial quantities of metal within the pores of a porous body such as ceramics or porous plastic or the like. That is, the process of the invention is applicable to any porous substance which will withstand heating to the decomposition temperature of the carbonyl compound. The resulting structure shows substantially increased density, enhanced strength, and a very interesting type of electrical conductivity which is to all intents and purposes exclusively a "skin effect" for the conduction of electric current whereby very valuable resistors can be prepared and many valuable radio frequency facts observed, particularly in the construction of condenser bushings for use at high frequencies.

Thus the products of the present invention are particularly applicable to the making of ceramic resistors for electrical purposes, for which the change in resistance with change in frequency, which is inherent in the "skin effect" of high frequency currents when travelling in solid conductors, is substantially avoided since the particles of deposited metal are practically always smaller than the "skin effect" thickness of any but the ultra high electrical frequencies. Similarly the products of the process here claimed are particularly useful where weighted fabrics are desired since the decomposition temperature for the most carbonyls usually is below a temperature at which the ordinary fabrics are injured. Similarly the process may be applied to any of the porous natural or synthetic stones for ornamental purposes of one sort or another, and the procedure forms an excellent initial layer upon porous non-conducting substances upon which it is desired to apply an electro-deposited coating. These uses are however representative of a wide range of other uses which will be obvious to those skilled in the art.

Other objects and details of the invention will be apparent from the following description.

The first raw material for the construction of the invention is found in a porous body which is usually of ceramic material but may be any porous body which will withstand the temperature required for decomposition of the carbonyl such, for instance, as plaster of Paris set from a small excess of water so as to be porous; all of the porous natural stones such as limestone and the like; Portland cement, especially when produced from a mixture containing an excess of water to yield substantial pores; nearly all of the woven, knitted and felted fabrics, especially paper to which an excellent layer of metal can be applied by a flash heating of the paper containing the metal carbonyl to a temperature below the charring temperature, and many other similar porous substances.

The second component of the new structure is a metal carbonyl, usually either nickel carbonyl or iron carbonyl, these being the only easily prepared carbonyls, carbonyls of other metals being either impossible of preparation or prohibitively difficult.

In the operation of the invention the porous body and the carbonyl are cooled to a temperature such that the carbonyl is liquid and will soak into the porous body at a reasonable speed. It is of course possible to cool both carbonyl and porous body to a relatively low temperature, then submerge the porous body in the liquid carbonyl and apply a moderate vacuum to remove air from the pores, whereupon the reapplication of atmospheric pressure or a moderately elevated pressure will force the carbonyl into the pores of the porous body. This procedure may be repeated if desired until an appropriate amount of the metal carbonyl has been introduced into the pores of the porous body. The porous body may then be removed from the liquid carbonyl and brought up to the decomposition temperature of the carbonyl, whereupon the metal is rapidly deposited in the pores and the carbon monoxide passed off as a gas.

By this procedure it thus becomes possible to prepare a highly desirable electric resistor which is suitable for all frequencies of current; but is especially suitable for relatively high radio frequency currents. It will be observed that the electrical resistance of any such structure is dependent upon the amount of metal lodged in the pores and upon the character of contact between the metal in adjacent pores. It is thus possible to provide a resistor in almost any desired size having a resistance ranging from megohms down to a small number of ohms. It will be further noted that the resistance per mm. cube is substantially constant throughout the entire body of the ceramic, this being dependent upon the care with which a uniform impregnation of the porous body is accomplished. It will further be noted that the metal is deposited in the form of thin films on the inside of the pores and that accordingly surface flow of the electric current on the metal surface is practically the only possibility; hence the resulting resistor does not show any pronounced "skin effect," with change of frequence of the current flowing therefrom and accordingly direct current resistance and the radio frequency resistance are substantially identical with substantially no difference in resistance, regardless of the frequency of the applied current. Furthermore, the resistance being uniform throughout the body of the resistor, the rate of heat development from current flow is uniform throughout that body and the presence of the metal films gives an unusually good thermal conductivity to the surface of the body. Furthermore the character of the metal deposit at the surface is particularly advantageous for the soldering thereto of connector leads which may be accomplished at low temperature for soft soldering; or high temperature soldering may be accomplished by the addition to the points of connection of greater quantities of metal carbonyl, by repeated applications until such an amount of metal occurs as to permit of either hard soldering or welding of leads to the resistor, thereby producing a resistor of outstanding ruggedness and thermal resistance.

The process is equally applicable to reactions involving the metallizing of cloth, paper or other fabrics since the carbonyl may be soaked into the fabric, more or less deeply as desired, held there by capillary forces and converted to metal and carbon monoxide by a flash heating. This procedure yields an exceedingly satisfactory base to which other metals such as gold, platinum, silver and the like may be deposited by a simple electro-deposition procedure, or merely by a treatment with the metal salts in solution since most of them, including copper and the copper group of metal salt, are precipitated by iron or nickel. Similarly the process is highly satisfactory for the metallizing of the surfaces of stone, either synthetic or natural, and a deposit of metal in the pores of the stone may be obtained and used as such, or covered with some of the less easily oxidizable metals as desired; either by electro-deposition or double decomposition of the salts.

It is above pointed out that a wide range of resistances per unit volume can be obtained by control of the amount of metal carbonyl instilled into the porous solid. If the quantity is small enough so that separate films of metal are deposited within the pores but not in contact with each other, the material, even though it contains considerable metal, may remain a non-conductor for direct current. However, the presence of the metal particles yields an electro-capacitative effect which may be utilized for the making of condensers, particularly condenser bushings or insulating sleeves to be positioned between a conductor at high voltage and a grounded support, which will show a relatively high electrostatic capacitant sufficient to distribute the electrostatic stresses in the bushing, advantageously, to increase the breakdown voltage in the bushing.

By the structure and process of the present invention there is thus obtained a porous body having films of metal deposited within the pores.

While there are above disclosed but a limited number of embodiments of the process and structure of the invention it is possible to provide still other embodiments without departing from the invention concept herein disclosed, and it is therefore desired that only such limitations be imposed upon the appended claims as are stated therein or required by the prior art.

The invention claimed is:

1. The process of depositing metal in the pores of the porous body comprising the steps in combination of impregnating said body with liquid metal carbonyl whereby liquid metal carbonyl is introduced into the pores, and the liquid is held therein and in liquid condition by surface tension and capillary forces and thermally decomposing the carbonyl in situ by heating.

2. A method for metallizing the body of a porous structure comprising the steps in combination of instilling into the body a substantial quantity of liquid metal carbonyl, relying upon the capillary forces within the pores of the body to hold the metal carbonyl in liquid condition, during a rise in temperature, and thereafter heating the body quickly to the decomposition temperature of the metal carbonyl to precipitate the metal as such within the pores of the body.

References Cited in the file of this patent

UNITED STATES PATENTS

| | | |
|---|---|---|
| 401,120 | Bottome | Apr. 9, 1889 |
| 656,651 | Markey | Aug. 28, 1900 |
| 986,558 | Farkas | Mar. 14, 1911 |
| 1,738,044 | De Giovanni | Dec. 3, 1929 |
| 2,328,101 | Rosenblatt | Aug. 31, 1943 |
| 2,523,461 | Young et al. | Sept. 26, 1950 |
| 2,667,432 | Note | Jan. 26, 1954 |
| 2,698,812 | Schladitz | Jan. 4, 1955 |
| 2,733,167 | Stookey | Jan. 31, 1956 |

OTHER REFERENCES

Lange: "Handbook of Chemistry," 7th edition, Handbook Publishers Inc., pages 242, 243.

Powell et al.: "Vapor-Plating," 1955, John Wiley & Sons, Inc., page 61.